United States Patent [19]
Theriault et al.

[11] 3,844,889
[45] Oct. 29, 1974

[54] PROCESS OF PREPARING 2-HYDROXY-2-CARBOXYLTHYL-N(7-OR 8-CHLORO-4-QUINOLINYL)ANTHRANILATE

[75] Inventors: Robert John Theriault, Kenosha, Wis.; Earl Elmer Fager, Lake Villa; Norman Earl Wideburg, Waukegan, both of Ill.

[73] Assignee: Abbott Laboratories, North Chicago, Ill.

[22] Filed: May 10, 1973

[21] Appl. No.: 359,040

Related U.S. Application Data

[62] Division of Ser. No. 246,091, April 13, 1972, Pat. No. 3,764,603.

[52] U.S. Cl.............. 195/51 R, 195/29, 195/30
[51] Int. Cl.............................................. C12b 1/00
[58] Field of Search................. 195/30, 51 R, 29

[56] References Cited
UNITED STATES PATENTS
3,453,179   7/1969   Greenspan et al............... 195/51 R Primary Examiner—Alvin E. Tanenholtz
Attorney, Agent, or Firm—Robert L. Niblack; Joyce R. Krei; Vincent A. Mallare

[57] ABSTRACT

A process of preparing 2-hydroxy-2-carboxyethyl-N-(7- or 8-chloro-4-quinolinyl)anthranilate by microbial transformation of 2,3-dihydroxypropyl-N-(7- or 8-chloro-4-quinolinyl)anthranilate by microbial transformation of 2,3-dihydroxyproplyl-N-(7- or 8-chloro-4-quinolinyl) anthranilate. The compounds are useful as analgesic agents.

1 Claim, No Drawings

PROCESS OF PREPARING 2-HYDROXY-2-CARBOXYLTHYL-N(7-OR 8-CHLORO-4-QUINOLINYL)ANTHRANILATE

This is a division, of application Ser. No. 246,091 filed Apr. 13, 1972 now U.S. Pat. No. 3,764,603.

DETAILED DESCRIPTION OF THE INVENTION

This invention relates to derivatives of 2,3-dihydroxypropyl-N-(7- or 8-chloro-4-quinolinyl)anthranilate and to processes for preparing and using the compounds.

The compounds of this invention, 2-hydroxy-2-carboxyethyl-N-(7-chloro-4-quinolinyl)anthranilate and 2-hydroxy-2-carboxyethyl-N-(8-chloro-4-quinolinyl)anthranilate are represented by general Formula I

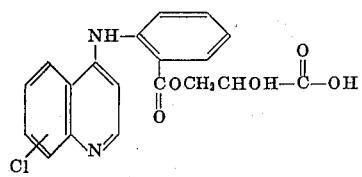

I wherein the chloro is in the 7- or 8-position.

The compounds of this invention are mild, aspirin-like analgesic agents when administered orally to warm-blooded mammals in dosages of from 200–300 mg./kg. daily, preferably in divided doses, e.g., four to six times daily. The analgesic activity was initially established in the acetic acid writhing assay (Whittle, Brit. J. Pharmcol., 22:246 [1964]).

The compounds can be prepared by subjecting the appropriate 7- or 8-chloro compound of Formula II to microbial transformation according to the following reaction sequence:

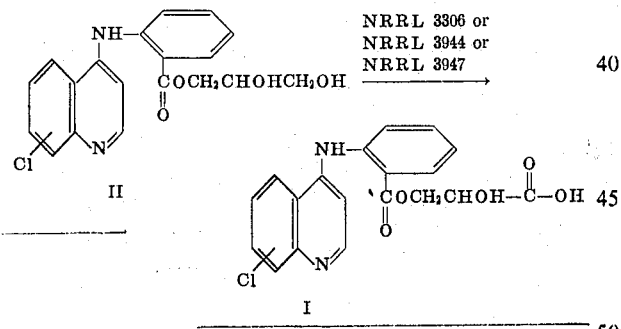

wherein the chloro is in the 7- or 8-position. The synthesis of the compounds of Formula II, 2,3-dihydroxypropyl-N-(7-chloro-4-quinolinyl)anthranilate and 2,3-dihydroxypropyl-N-(8-chloro-4-quinolinyl)anthranilate, are described in Belgian Pat. Nos. 678,551, published Sept. 28, 1966 (8-chloro) and 636,381, published Feb. 20, 1964 (7-chloro).

2-Hydroxy-2-carboxyethyl-N-(7- or 8-chloro-4-quinolinyl)anthranilate are generally prepared by cultivating, under controlled conditions, the following microorganisms: Cultures belonging to the

| Class: | Basidiomycetes |
| Order: | Agaricales |
| Family: | Agaricaceae |
| Genera: | Coprinus and Marasmius |
| Species: | Coprinus sclerotigenus 933 NRRL-3066 |
|  | Marasmius rotula SS-9 NRRL-3944 | and cultures belonging to the

| Class: | Shizomycetes |
| Order: | Actinomycetales |
| Family: | Streptomycetaceae |
| Genus: | Streptomyces |
| Species: | Streptomyces sp. Act-9 NRRL-3947 |

Generally speaking, the compounds of this invention are prepared by inoculating a culture of one of the above-described microorganisms from 14 day old agar slant cultures into multiple flasks containing a suitable media. The inoculated flasks are incubated on a shaker for from 48–96 hours, at which time 0.05–0.1 percent of the powdered substrate, 2,3-dihydroxypropyl-N-(7- or 8-chloro-4-quinolinyl)anthranilate (50–100 mg./100 ml. medium) is added to each flask. After addition of the substrate, the flasks are returned to the shaker and harvested at the optimum times of 336–408 hours.

The harvested fermentation flasks are pooled and the beer is adjusted to pH 9.0 with $NH_4OH$. The fermentation beer is then extracted twice with 2 volumes of the ethyl acetate and the extract is evaporated to dryness in vacuo. The ethyl acetate residue is then dissolved in a suitable solvent such as methanol or ethanol, and the resulting product obtained by either column or thin-layer chromatography (TLC).

The following fermentation media are used in the practice of this invention:

FERMENTATION MEDIA

| A | Grams/liter |
| --- | --- |
| Glucose monohydrate (added post sterilization) | 50.0 |
| Soy fluff flour | 5.0 |
| Yeast extract | 5.0 |
| $KH_2PO_4$ | 2.3 |
| $K_2HPO_4$ | 0.84 |

The pH is adjusted to approximately 6.5 and deionized water is added to adjust the volume to 1.0 liter.

| B | Grams/liter |
| --- | --- |
| Glucose monohydrate (added post sterilization) | 50.0 |
| Soybean grits | 5.0 |
| Yeast extract | 2.5 |
| NaCl | 1.0 |
| $K_2HPO_4$ | 2.0 |
| $KH_2PO_4$ | 1.0 |

The pH is adjusted to 6.8–7.0 and deionized water is added to adjust the volume to 1.0 liter.

The following examples further illustrate this invention.

EXAMPLE 1

Preparation of 2-hydroxy-2-carboxyethyl-N-(7-chloro-4-quinolinyl)anthranilate

*Marasmius rotula* SS–9 NRRL–3944 was inoculated from 14 day old agar slant cultures into a series (approximately 200) of sterile cotton plugged 500 ml. Erlenmeyer flasks containing 100 ml. of medium A. The inoculated flasks were incubated on a Gump rotary shaker (250 rpm's) at 28°C. After 72 hours incubation, 0.05 percent of 2,3-dihydroxypropyl-N-(7-chloro-4-quinolinyl)anthranilate (50 mg./100 ml. medium) was added in powdered form to each flask. The flasks were again incubated on the shaker and were sampled at various ages during the fermentation, as previously described, for TLC analysis in order to determine the optimal harvest age. All flasks were harvested at the peak yield of the major microbial conversion product. The contents (whole culture) of each flask were pooled and filtered. The mycelia was then extracted with acetone: 0.01M $NH_4OH$ (1:1). The mycelial aqueous acetone extract was adjusted to pH 7.0 with HCl, combined with the filtered beer and concentrated to 1/10 volume under vacuum. The concentrated, filtered beer and mycelial extract were then passed over a Darco G–60 carbon:celite 545 (1:1) column to absorb the desired product. The column was washed with water, chloroform and finally 50 percent aqueous acetone. The microbial transformation product was eluted with 0.1M $NH_4OH$:acetone (1:1). The eluate fractions were pooled and dried in vacuo, and the residue was extracted with ethanol: 0.25N $NH_4OH$ (100:8). This extract was diluted with one volume of ethyl acetate and applied to a silica gel GF–254 (Merck-Darmstadt) column slurry packed with ethyl acetate:ethanol:0.25N $NH_4OH$ (50:50:4). The column was developed with the same solvent system. Eluate fractions containing the desired conversion product were combined and dried under vacuum. The residue was extracted with cold ethanol, filtered and further purified by preparative thin-layer chromatography on a series of 20 × 20 cm glass plates coated with silica gel $GF^{254}$ (Merck-Darmstadt) about 500 microns in thickness. The plates were developed in a solvent system consisting of $CH_2Cl_2$:$CH_3OH$:$NH_4OH$ (75:25:1). The desired product was eluted with acidified 90 percent aqueous acetone, and further purified by differential solvent extraction of the dried residue. The product is represented by the formula

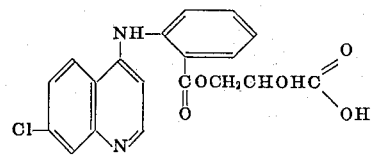

This structure was confirmed by 100 $MH_z$ nmr spectroscopy and by high resolution mass spectroscopy. Exact mass measurement: 386.0667 Calculated for $C_{19}H_{15}N_2O_5Cl$: 386.0669. The product does not have a sharp melting point but softens beginning at 142°C.

EXAMPLE 2

Preparation of 2-hydroxy-2-carboxyethyl-N-(7- and 8-chloro-4-quinolinyl)anthranilate Cultures belonging to the genera Coprinus and Mara Marasmius were inoculated from 14 day old agar slant cultures into sterile plugged 500 ml. Erlenmeyer flasks containing 100 ml. of medium A. Cultures belonging to the genus Streptomyces were inoculated into identical flasks containing 100 ml. of medium B. After inoculation, the flasks were incubated at 28°C. on a Gump rotary shaker (250 rpm's) for 48 hours to 72 hours. At that time, growth was sufficient to permit the addition of 0.05 percent of 2,3-dihydroxypropyl-N-(7-chloro-4-quinolinyl)anthranilate or 0.05 percent of 2,3-dihydroxypropyl-N-(8-chloro-4-quinolinyl)-anthranilate (50 mg./100 ml. medium) in powdered form. The flasks were again incubated on the shaker and were sampled and extracted for thin-layer chromatography analysis as previously described.

Coprinus sclerotigenus 933 NRRL–3306 and Streptomyces species ACT–9 NRRL–3947 each produce a microbial transformation product from the 7-chloro substrate which has the same TLC, $R_f$, UV adsorption at 254 millimicrons and fluorescence at 336 millimicrons as does the product produced by Marasmius rotula SS–9 NRRL–3944 described in Example 1. These three cultures transform the 8-chloro substrate to yield products having TLC, $R_f$ and UV radiation characteristics identical with the products from the 7-chloro substrate indicating the same microbial transformation of either substrate.

The compounds of this invention can be formulated into various pharmaceutical dosage forms such as tablets, capsules, pills, sterile aqueous or non-aqueous solutions for parenteral administration and the like, for immediate or sustained release, by combining one or more of the active compounds with one or more pharmaceutically acceptable carriers or diluents, according to methods well known in the art. Such dosage forms may additionally include excipients, binders, fillers, flavoring and sweetening agents and other therapeutically inert ingredients necessary in the formulation of the particular dosage form.

We claim:

1. A method of producing a compound of the formula

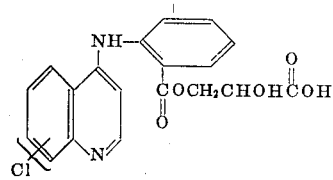

wherein the chloro atom is in the 7- or 8-position, said method comprising culturing a suitable microorganism selected from the group consisting of
   Streptomyces species Act–9, NRRL 3947,
   Coprinus sclerotigenus 933, NRRL 3306, and
   Marasmius rotula SS–9, NRRL 3944,
in a nutrient medium containing suitable sources of carbon, nitrogen and minerals in the presence of a second compound of the formula

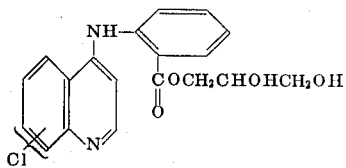

wherein the chloro atom is in the 7- or 8-position, for a sufficient time to transform said second compound to said desired compound.

* * * * *